United States Patent Office 3,126,493
Patented Mar. 24, 1964

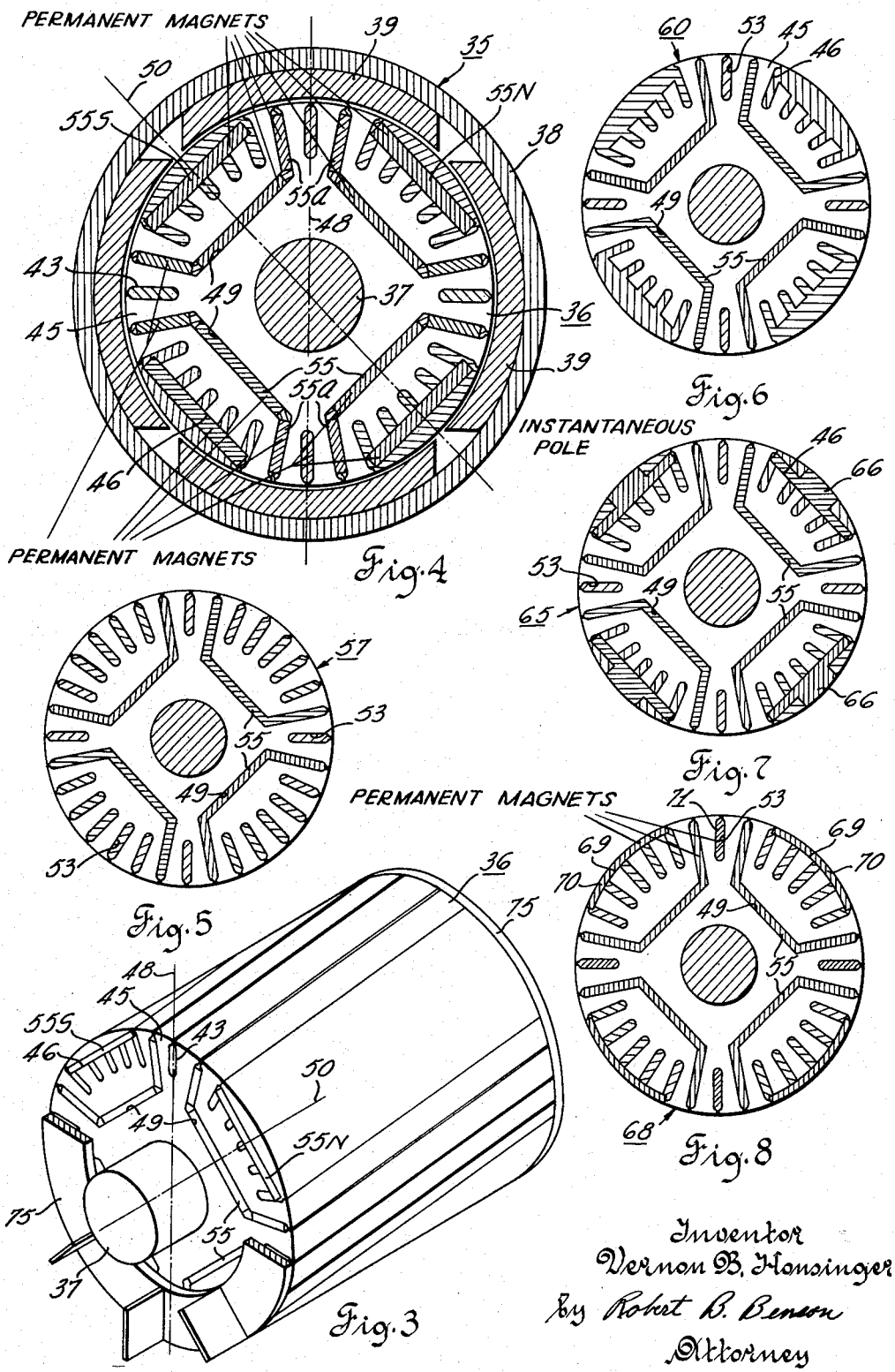

3,126,493
PERMANENT MAGNET MOTOR
Vernon B. Honsinger, Cincinnati, Ohio, assignor to Allis-Chalmers Manufacturing Company, Milwaukee, Wis.
Filed Sept. 13, 1960, Ser. No. 55,621
9 Claims. (Cl. 310—156)

This invention relates generally to synchronous motors. More specifically, this invention relates to synchronous motors of the reluctance type.

A number of improvements have been made in synchronous induction motors of the reluctance type in recent years. Examples are the U.S. Patents 2,769,108, N. O. Risch and 2,733,362, P. F. Bauer et al. These patents teach motors that utilize flux barriers in the rotor core to guide the direct axis flux and minimize the quadrature axis flux in the motor. In motors of this type, it may be shown that the direct and quadrature currents flowing in the stator are:

$$I_q = \frac{VZ_d}{X_dX_q + R^2} \cos(\phi_d - \delta)$$

$$I_d = \frac{VZ_q}{X_dX_q + R^2} \sin(\phi_q - \delta)$$

where V is the phase voltage, R the resistance per phase of the stator, $\delta$ the angle between V and $I_q$ also called the torque angle and ($Z_d$, $Z_q$), ($X_d$, $X_q$) are the direct and quadrature impedances and reactances per phase respectively and $\phi_d$, $\phi_q$ are the angles between R and $X_d$, $X_q$, respectively. The total current flowing to the motor (excluding a small component due to core loss which is nonessential to this discussion) is:

$$I = \sqrt{I_d^2 + I_q^2}$$

Now, the equations for $I_d$ and $I_q$ may be put together by geometric processes so as to define the locus of the current I in graphical form. The locus so formed is that of a circle as illustrated in FIG. 1. This will be used to illustrate the strengths and limitations of this type motor.

This circle, illustrated in FIG. 1, may be defined as follows:

(1) Its radius is $$\frac{V(X_d - X_q)}{2(X_qX_d + R^2)}$$

(2) Its center is located a point shifted upward (positive) along the vertical ordinate by a distance $$\frac{VR}{X_dX_q + R^2}$$

which represents a component of in phase current (excluding a small component due to core loss which is nonessential to this discussion) and to the right (positive) along the horizontal abscissa by a distance $$\frac{V(X_d + X_q)}{2(X_dX_q + R^2)}$$

which represents a component of reactive current or a current in quadrature with the voltage.

From this diagram, the power factor angle $\phi$ between the voltage V and the current I may be measured for any given input. The power factor is cos $\phi$. Further, the power and torque output of the motor may be measured. These are closely proportional to the projection of the line current I on the voltage axis or $I \cos \phi$. The power factor and torque producing qualities of the motor are basic and important criteria of quality. The maximum torque or pullout torque occurs near the top of the circle where $\delta$ equals $\pi/4$ radians.

Now, in motors of this type, the maximum power factor depends greatly upon the ratio $(1 - X_q/X_d)/(1 + X_q/X_d)$ and the pullout torque is closely proportional to a constant $k$ times the difference between the reciprocal of the quadrature axis reactance and the reciprocal of the direct axis reactance.

$$T_{p.o.} = k\left(\frac{1}{X_q} - \frac{1}{X_d}\right)$$

Therefore, to obtain maximum pullout torque and maximum power factor for the motor, the quadrature axis reactance must be reduced to a minimum while maintaining the direct axis reactance near its maximum. Since the reactance is proportional to the flux, it follows that the quadrature axis flux should be reduced to a minimum and a direct axis flux be increased to its maximum. The flux barriers and the quadrature axis slots in the above mentioned patents went a long way toward producing an efficient motor having a relatively high power factor and pullout torque. The flux barriers were usually made of a nonmagnetic material such as aluminum. The barriers had to be fairly large in width or number and had to be accompanied by a quadrature axis slot to effectively reduce quadrature axis flux. This, of course, reduced the amount of iron in the core available for carrying the direct axis flux.

Going back for the moment to the circle diagram, it is evident that a motor with poor pullout torque and poor power factor is one whose circle diagram has a small radius $$\frac{V}{2}\left(\frac{X_d - X_q}{X_qX_d + R^2}\right)$$

and is farthest removed from the origin. As has been explained, the pullout torque is proportional to $$T_{p.o.} = k\left(\frac{1}{X_q} - \frac{1}{X_d}\right)$$

and the maximum power factor cos $\phi_m$ is proportional to $$\cos \phi_m = k\frac{1 - X_q/X_d}{1 + X_q/X_d}$$

Comparing first the equation of circle radius with pullout torque, it is seen that each of these depend upon the quantity ($1/X_q - 1/X_d$). Therefore, the larger the circle diameter, the larger the pullout torque. Our goal of large power factors necessarily requires a large $X_d$ and this means a small $V/X_d$ or a shift of the circle toward the origin in FIG. 1. This will provide greater power factors. Thus, when $X_q$ is small and $X_d$ is large (1) The circle diameter is large
(2) The circle tends to be shifted to the left toward the origin.

These factors acting in concert produce high pullout torques and large power factors.

Thus, historically speaking and with reference to FIG. 2, the first motors manufactured in large quantities of this type ( commonly called reluctance motors) used axially extending grooves along the periphery of the rotor. Such motors as these were poor, relatively speaking, and could be represented by the circle 20 of FIG. 2. The second step, historically speaking, was to add flux barriers in the core iron. This improved the motor and the new circle could be represented by 21 of FIG. 2. The third step, historically speaking, is the use of permanent magnets in addition to the flux barriers. This motor is illustrated by circle 22 which shows that the power factor and pullout torque are improved. In each case there is an improvement in pullout torque. The currents 20, 21 and 22 are all drawn to indicate a comparison at the same power input.

The motor of this invention provides better operating characteristics than the prior art synchronous induction motors mentioned above by placing permanent magnets in the rotor core that oppose the quadrature axis flux. These permanent magnets are selectively positioned in the rotor core to reduce the quadrature axis flux to near zero. Furthermore, by using permanent magnets to oppose the quadrature axis flux, the space requirements for flux barriers are somewhat reduced. In addition to this, the axially extending grooves in motors such as shown in U.S. Patent 2,733,362 may be reduced in depth and even entirely eliminated in certain cases. Either step separately or both steps together provide proportionately more iron in the core for carrying the useful, direct axis flux. Since the motor of this invention more efficiently reduces the quadrature axis flux while at the same time providing more iron to carry the direct axis flux, the motor of this invention can provide proportionately more torque and hence more horsepower output than a comparable prior art motor of the same size.

Therefore, it is the object of this invention to provide a new and improved, synchronous, induction motor.

Another object of this invention is to provide a synchronous, induction motor having an increased ratio of direct axis flux to quadrature axis flux in the rotor.

Another object of this invention is to provide a new and improved, synchronous, induction motor that utilizes permanent magnets in the rotor to oppose the quadrature axis flux.

Another object of this invention is to provide a new and improved, synchronous, induction motor that produces a greater torque, has a higher power factor and is more efficient than comparable prior art, synchronous, induction motors of the same size.

Other objects and advantages of this invention will be apparent from the following description when read in connection with the accompanying drawings, in which:

FIG. 3 is a pictorial view partially in section of the preferred embodiment of the motor of this invention;

FIG. 4 is a cross sectional view of a motor embodying the rotor of FIG. 3; and

FIGS. 5, 6, 7 and 8 are cross sectional views of the rotors of other embodiments of the motor of this invention.

Like characters of reference have been used in the different views to indicate the same or similar parts in the different embodiments.

Figure 1:
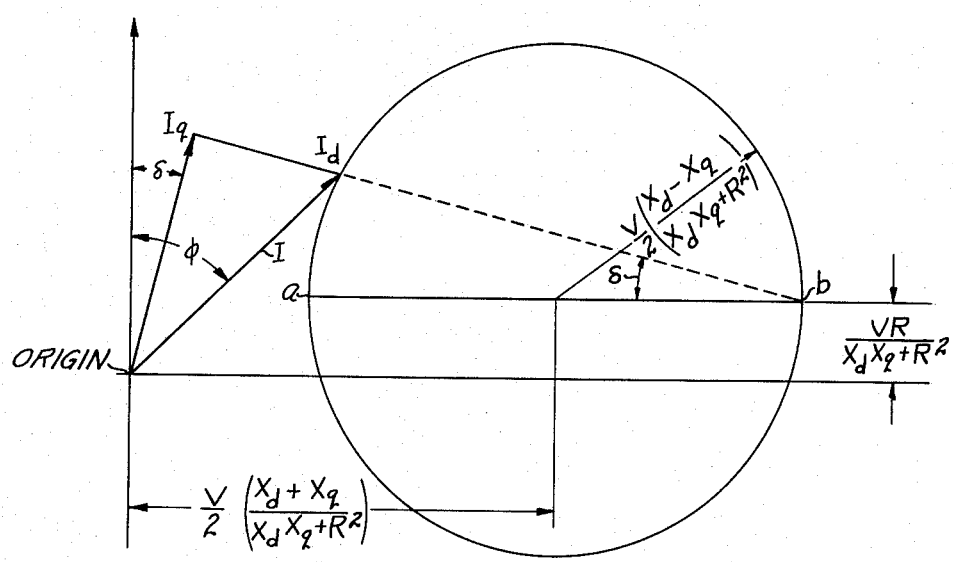
FIG. 1 is a circle diagram for a motor of this invention.
Figure 2:
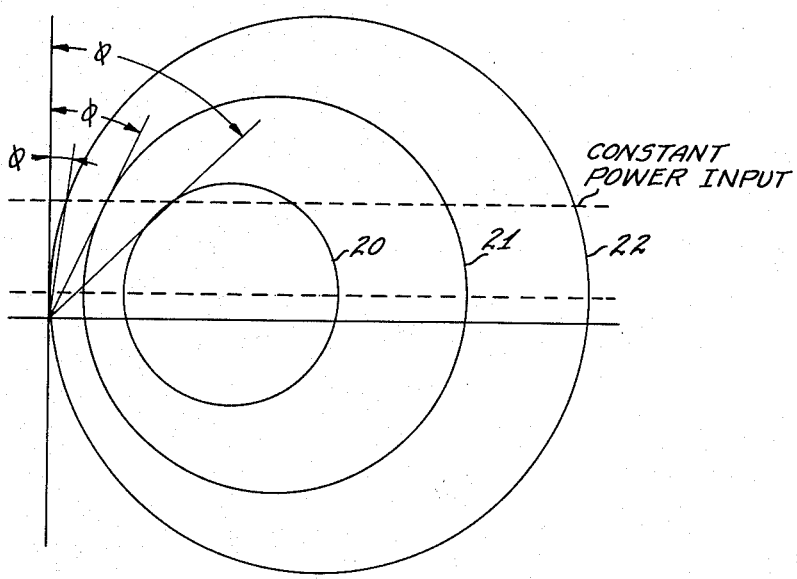
FIG. 2 is a series of circle diagrams comparing certain prior art motors with the motor of this invention.

As shown in FIGS. 3 and 4, the motor 35 of this invention comprises a cylindrical rotor 36 mounted on a shaft 37 for rotation therewith and positioned within a stator 38. The stator 38 is of the distributed winding type normally used in induction motors and is schematically illustrated as providing four rotating poles 39. The rotor 36 is made us of a series of laminations having a plurality of arcuately spaced winding slots 43 near the periphery of the rotor.

The rotor 36 of this invention is a salient pole rotor. The salient poles 45 may be formed between arcuately spaced cutouts or grooves 46 such as shown in FIG. 4 or may be effective magnetic salient poles formed by appropriately designed flux barriers such as in FIG. 5. Flux barriers are high reluctance material that opposes flux. In this invention, they are positioned in the rotor to provide high reluctance flux paths and low reluctance flux paths. The area near the periphery of the rotor that is in the low reluctance flux path becomes an effective magnetic salient pole and flux from the stator concentrates in this area. Hence, magnetic salient poles can be provided on a cylindrical rotor such as the rotor of FIG. 5 by using flux barriers in the interior of the rotor rather than arcuately spaced cutouts along the periphery of the rotor.

As is well-known in the art, the center line of this salient pole or area of flux concentration is called the direct axis and the quadrature axis is 90 electrical degrees removed from the direct axis. In the rotors illustrated, the direct axis 48 lies between the flux barriers 49 and the quadrature axis 50 lies halfway between adjacent direct axes.

In the preferred embodiment of the motor as illustrated in FIG. 4, the rotor 36 is provided with salient poles 45 formed between axially extending grooves 46 spaced along the periphery of the rotor. Each pole 45 has at least one inwardly extending flux barrier but, as shown, each pole 45 is preferably provided with a pair of flux barrier slots 49 that extends radially inward toward the rotor shaft 37 and continue on to an adjacent salient pole 45 without reaching the hub of the rotor. These barriers 49 are positioned to oppose the quadrature axis flux while providing a minimum of interference with the direct axis flux. The salient poles 45 are provided with regular winding slots 43.

In accordance with this invention, permanent magnets 55 are selectively positioned in the rotor to oppose some of the quadrature axis flux induced in the rotor by the rotating magnetic poles on the stator. As shown in FIG. 4, the magnets 55 are positioned in the radially inner portion of the flux barrier slots 49 and in the axially extending grooves 46 so that they are symmetrical with the quadrature axis 50. The magnets 55 in angularly adjacent grooves 46 have their polarity reversed so that magnets in alternate grooves 46 have their north poles facing radially outward and magnets in the other grooves 46 have their south pole facing radially outward. The letter N (north) or S (south) indicates the polarity of the magnet 55 facing radially outward. During operation the flux from a rotating stator pole 39 trying to enter the rotor between poles 45 will be repulsed by the magnets 55N and flux trying to enter a stator pole 39 from the area of the rotor between poles and will be repulsed by the magnets 55S. This, of course, will reduce the quadrature axis flux of the motor. As the rotor approaches synchronous speed, the rotor will automatically orientate itself so that poles 45 will lock in with rotating poles of the stator.

Permanent magnets 55(a) may be placed in the flux barrier slots near the periphery of the rotor. These magnets are positioned so that the poles facing the magnet 55 in the groove 46 is the same as the radially outwardly facing pole of that magnet.

FIGS. 5 through 8 are cross section views of rotors of different embodiments of the invention in which permanent magnets have been mounted in different positions in the rotor. In each case the magnets are positioned to oppose the quadrature axis flux in the rotor and they operate in substantially the same manner as described in connection with the rotor of FIG. 4.

FIG. 5 shows a rotor 57 in which the axially extending grooves have been eliminated to maximize direct axis flux while utilizing permanent magnets 55 in the flux barrier slots 49 to form effective magnetic salient poles and to minimize quadrature axis flux. As mentioned above, the barriers in this rotor have to provide sufficient reluctance to flux in one path to cause the rotor to have effective magnetic salient poles in the areas near the outermost extensions of the flux barrier slots.

FIG. 6 shows a rotor 60 in which there are axially extending grooves 46 without permanent magnets to form the salient poles 45. However, permanent magnets 55 are used in the flux barrier slots 49 to minimize quadrature axis flux.

FIG. 7 shows a rotor 65 having permanent magnets positioned in both the axially extending grooves 46 and in the flux barrier slots 49. The permanent magnets 66 illustrated in the axially extending grooves 46 are of variable strength to give selectively variable flux densities in the air gap. The variable flux density of the quadrature axis field can be matched point by point by the opposing flux of the permanent magnets. While a "stepped" magnet is shown in FIG. 7 other functional shapes such as "sinusoidal" could be used.

FIG. 8 shows a rotor 68 having permanent magnets positioned in axially extending grooves 69 and in the flux barrier slots 49 but in this case the permanent magnets 70 in the axially extending grooves 69 completely fill the groove. The groove, therefore, has the minimum depth associated with the use of permanent magnets therein. This provides a maximum of iron for the direct axis flux and hence has the effect of further strengthening the direct axis flux while still weakening the quadrature axis flux. FIG. 8 also shows permanent magnets 71 situated in the regular winding slot 53 at the center of the salient pole intermediate the flux barriers 49. This is an optional step taken to further diminish quadrature axis flux.

In all the rotors illustrated in the drawings, an electric conducting nonmagnetic material fills the space in the regular winding slots 53, the axially extending grooves 46 and the flux barriers 49 not occupied by permanent magnets. This electric conducting material is short circuited at the ends of the rotor such as by rings 75 to form a squirrel cage winding.

Although various modifications of the invention have been explained, it is obvious that other changes and modifications can be made therein without departing from the spirit of the invention or the scope of the appended claims.

Having now particularly described and ascertained the nature of my said invention and the manner in which it is to be performed, I declare that what I claim is:

1. A synchronous induction motor comprising a stator, said stator having windings disposed therein to provide a rotating set of magnetic field poles, a rotor mounted for rotation within said stator, said rotor comprising a magnetic core, flux barriers positioned in said core and being arcuately spaced in said core to oppose some of the flux induced in the rotor by said stator windings, and form by consequence, magnetic salient poles in said core, and permanent magnets in said core orientated to oppose quadrature axis flux in said rotor.

2. A synchronous induction motor comprising a stator, said stator having windings disposed therein to provide a rotating set of magnetic field poles, a rotor mounted for rotation within said stator, said rotor comprising a magnetic core, flux barriers positioned in said core and being arcuately spaced in said core to oppose some of the flux induced in the rotor by said stator windings, and form by consequence, magnetic salient poles in said core, and permanent magnets in said flux barriers orientated to oppose quadrature axis flux in said rotor.

3. A synchronous induction motor comprising a stator, said stator havings windings disposed therein to provide a rotating set of magnetic field poles, a rotor mounted for rotation within said stator, said rotor comprising a magnetic core having a plurality of circumferentially spaced, salient poles separated by axially extending grooves, each of said salient poles being provided with at least one flux barrier slot extending radially inward to near the hub of said rotor and then continuing to an adjacent salient pole without touching the bore in the rotor, permanent magnets positioned in said core to oppose the quadrature axis flux induced in the rotor by said stator windings, said slots and grooves being filled with a nonmagnetic, electrically conducting material and interconnected at the ends of the rotor to form a squirrel cage winding.

4. A synchronous induction motor comprising a stator, said stator having windings disposed therein to provide a rotating set of magnetic field poles, a rotor mounted for rotation within said stator, said rotor comprising a magnetic core having a plurality of circumferentially spaced, salient poles separated by axially extending grooves, each of said salient poles being provided with at least one flux barrier slot extending radially inward to near the hub of said rotor and then continuing to an adjacent salient pole without touching the bore in the rotor, permanent magnets positioned in said barrier slots to oppose some of the flux induced in said rotor by said stator windings, said slots and grooves being filled with a nonmagnetic, electrically conducting material and interconnected at the ends of the rotor to form a squirrel cage winding.

5. A synchronous induction motor comprising a stator, said stator having windings disposed therein to provide a rotating set of magnetic field poles, a rotor mounted for rotation within said stator, said rotor comprising a magnetic core having a plurality of circumferentially spaced, salient poles separated by axially extending grooves, each of said salient poles being provided with at least one flux barrier slot extending radially inward to near the hub of said rotor and then continuing to an adjacent salient pole without touching the bore in the rotor, permanent magnets positioned in said grooves to oppose the quadrature axis flux induced in said rotor by said stator windings, said slots and grooves being filled with a nonmagnetic, electrically conducting material and interconnected at the ends of the rotor to form a squirrel cage winding.

6. A synchronous induction motor comprising a stator, said stator having windings disposed therein to provide a rotating set of magnetic field poles, a rotor mounted for rotation within said stator, said rotor comprising a magnetic core having a plurality of circumferentially spaced, salient poles separated by axially extending grooves, each of said salient poles being provided with at least one flux barrier slot extending radially inward to near the hub of said rotor and then continuing to an adjacent salient pole without touching the bore in the rotor, permanent magnets positioned in said barrier slots and said grooves to oppose the quadrature axis flux induced in said rotor by said stator windings, said slots and grooves being filled with a nonmagnetic, electrically conducting material and interconnected at the ends of the rotor to form a squirrel cage winding.

7. A synchronous induction motor comprising a stator, said stator having windings disposed therein to provide a rotating set of magnetic field poles, a rotor mounted for rotation within said stator, said rotor comprising a magnetic core having a plurality of circumferentially spaced, salient poles separated by axially extending grooves, each of said salient poles being provided with at least one flux barrier slot extending radially inward to near the hub of said rotor and then continuing to an adjacent salient pole without touching the bore in the rotor, permanent magnets positioned in said grooves to oppose the quadrature axis flux induced in the rotor by said stator windings, said magnets having a variable strength measured along its radially outer surface, said slots and grooves being filled with a nonmagnetic, electrically conducting material and interconnected at the ends of the rotor to form a squirrel cage winding.

8. A synchronous, induction motor comprising: a stator, said stator having windings disposed therein to provide a rotating set of magnetic field poles, a rotor mounted for rotation within said stator, said rotor comprising a magnetic core having a plurality of arcuately spaced flux barrier slots arranged to form a plurality of arcuately spaced, effective magnetic salient poles, permanent magnets positioned in said barrier slots and along the periphery of said core intermediate said poles, said magnets being magnetically arranged to form high reluctance flux paths to oppose quadrature axis flux induced in the rotor by said stator windings intermediate said salient pole, the remaining area in said slots and grooves being filled with a nonmagnetic electrically conducting material and interconnected at the ends of the rotor to form a squirrel cage winding.

9. A synchronous induction motor comprising a stator, said stator having windings disposed therein to provide a rotating set of magnetic field poles, a rotor mounted for rotation within said stator, said rotor comprising a magnetic core having a plurality of circumferentially spaced, salient poles separated by axially extending grooves, each of said salient poles being provided with a pair of flux barrier slots extending radially inward to near the hub of said rotor and then continuing to an adjacent salient pole without touching the bore in the rotor, permanent magnets positioned in said barrier and said grooves, said magnets in said barriers being magnetically aligned with the magnets in the grooves to form high reluctance paths between said grooves, the remainder of said slots and grooves being filled with a nonmagnetic, electrically conducting material and interconnected at the ends of the rotor to form a squirrel cage winding.

References Cited in the file of this patent

UNITED STATES PATENTS

| | | |
|---|---|---|
| 2,398,653 | Linlor | Apr. 16, 1946 |
| 2,442,626 | Tolson | June 1, 1948 |
| 2,913,607 | Douglas | Nov. 17, 1959 |
| 2,939,025 | Williford | May 31, 1960 |